United States Patent
Polcyn et al.

(10) Patent No.: US 9,185,053 B2
(45) Date of Patent: Nov. 10, 2015

(54) VIRTUAL FAULT TOLERANT ETHERNET APPLIANCE AND METHOD OF OPERATION

(75) Inventors: Brian Polcyn, Phoenix, AZ (US); Jay Gustin, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 911 days.

(21) Appl. No.: 13/292,323

(22) Filed: Nov. 9, 2011

(65) Prior Publication Data

US 2013/0114610 A1 May 9, 2013

(51) Int. Cl.
| | |
|---|---|
| H04L 12/28 | (2006.01) |
| H04L 12/931 | (2013.01) |
| H04L 12/939 | (2013.01) |
| G06F 9/455 | (2006.01) |
| H04J 1/16 | (2006.01) |

(52) U.S. Cl.
CPC .......... *H04L 49/351* (2013.01); *G06F 9/45558* (2013.01); *H04L 49/557* (2013.01); *H04L 49/70* (2013.01); *G06F 2009/45579* (2013.01); *G06F 2009/45595* (2013.01)

(58) Field of Classification Search
USPC ................................. 370/252, 329, 386, 419
See application file for complete search history.

(56) References Cited

U.S. PATENT DOCUMENTS

| | | | | |
|---|---|---|---|---|
| 8,761,187 | B2* | 6/2014 | Barde | 370/409 |
| 2009/0276771 | A1* | 11/2009 | Nickolov et al. | 717/177 |
| 2011/0206055 | A1* | 8/2011 | Leong | 370/401 |
| 2012/0284712 | A1* | 11/2012 | Nimmagadda et al. | 718/1 |
| 2013/0077481 | A1* | 3/2013 | Philavong et al. | 370/228 |

OTHER PUBLICATIONS

"Intel Advanced Networking Services With Ethernet Teaming", Version 1.0, Dell, Inc., Feb. 1, 2005, 60 pages.
"ESX Server 2, Mainframe-Class Virtual Machines for the Most Demanding Environments", VMware, Inc., 2003, 5 pages.
"Barracuda Web Application Firewall Vx", Barracuda Networks, retrieved from the Internet on Nov. 28, 2011, 2 pages.

* cited by examiner

*Primary Examiner* — John Pezzlo

(57) ABSTRACT

An apparatus includes at least one processing unit configured to execute a virtual network appliance and a virtual machine. The virtual network appliance includes a virtual NIC driver configured to transfer packets to and from a physical port of the apparatus. The virtual network appliance also includes an internal network interface configured to transfer the packets to and from the virtual machine through a hypervisor. The virtual network appliance further includes an aggregator configured to transfer the packets between the virtual NIC driver and the internal network interface.

20 Claims, 3 Drawing Sheets

VIRTUAL FAULT TOLERANT ETHERNET APPLIANCE AND METHOD OF OPERATION

TECHNICAL FIELD

This disclosure relates generally to distributed computing networks. More specifically, this disclosure relates to a virtual fault tolerant Ethernet appliance and a method of operation.

BACKGROUND

Computing networks have expanded the utility of computing systems through their ability to exchange resources and information among one another. For example, computing networks have been implemented as distributed control systems (DCSs) that control dynamically changing industrial processes, such as manufacturing processes or other processes whose parameters may change on an ongoing basis according to various conditions. Implementation of a DCS in a computing network is often beneficial because control elements and sensor elements of the DCS are often configured in remote locations relative to one another. Sensor elements generally refer to those devices that measure parameters of a process, whereas control elements generally refer to those devices that manipulate various parameters of the process.

DCSs often require a relatively high level of reliability due to the critical nature of the industrial processes that these DCSs may control. For example, a DCS may be used to control a chemical processing plant that processes volatile or otherwise dangerous chemicals, which if not controlled properly could result in catastrophic damage to the chemical processing plant or the surrounding environment. The reliability of DCSs also extends to the ability to obtain information about a process and control the process in a real-time manner. The real-time processing capability of a DCS is generally referred to as determinism and generally relates to its ability to continually receive and process data associated with a process in a consistent and timely manner.

SUMMARY

This disclosure provides a fault tolerant Ethernet apparatus and method of operation.

In a first embodiment, an apparatus includes at least one processing unit configured to execute a virtual network appliance and a virtual machine. The virtual network appliance includes a virtual network interface card (NIC) driver configured to transfer packets to and from a physical port of the apparatus. The virtual network appliance also includes an internal network interface configured to transfer the packets to and from the virtual machine through a hypervisor. The virtual network appliance further includes an aggregator configured to transfer the packets between the virtual NIC driver and the internal network interface.

In a second embodiment, a method includes executing a virtual network appliance on a computing system, where the virtual network appliance includes an embedded real-time operating system. The method also includes receiving a packet from a physical port of the computing system at the virtual network appliance. The method further includes transferring the packet from the virtual network appliance to a virtual machine executed by the computing system through a hypervisor.

In a third embodiment, a computer readable medium embodies computer readable program code. The computer readable program code includes a hypervisor configured to be executed on a computing system. The computer readable program code also includes a virtual machine configured to be executed on the computing system and to be managed by the hypervisor. The computer readable program code further includes a virtual network appliance configured to be executed on the computing system and to be managed by the hypervisor. The virtual network appliance includes multiple virtual NIC drivers configured to communicate with multiple physical ports of the computing system, an internal network interface configured to transfer packets to and from the virtual machine, and an aggregator configured to transfer the packets between the virtual NIC drivers and the internal network interface.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
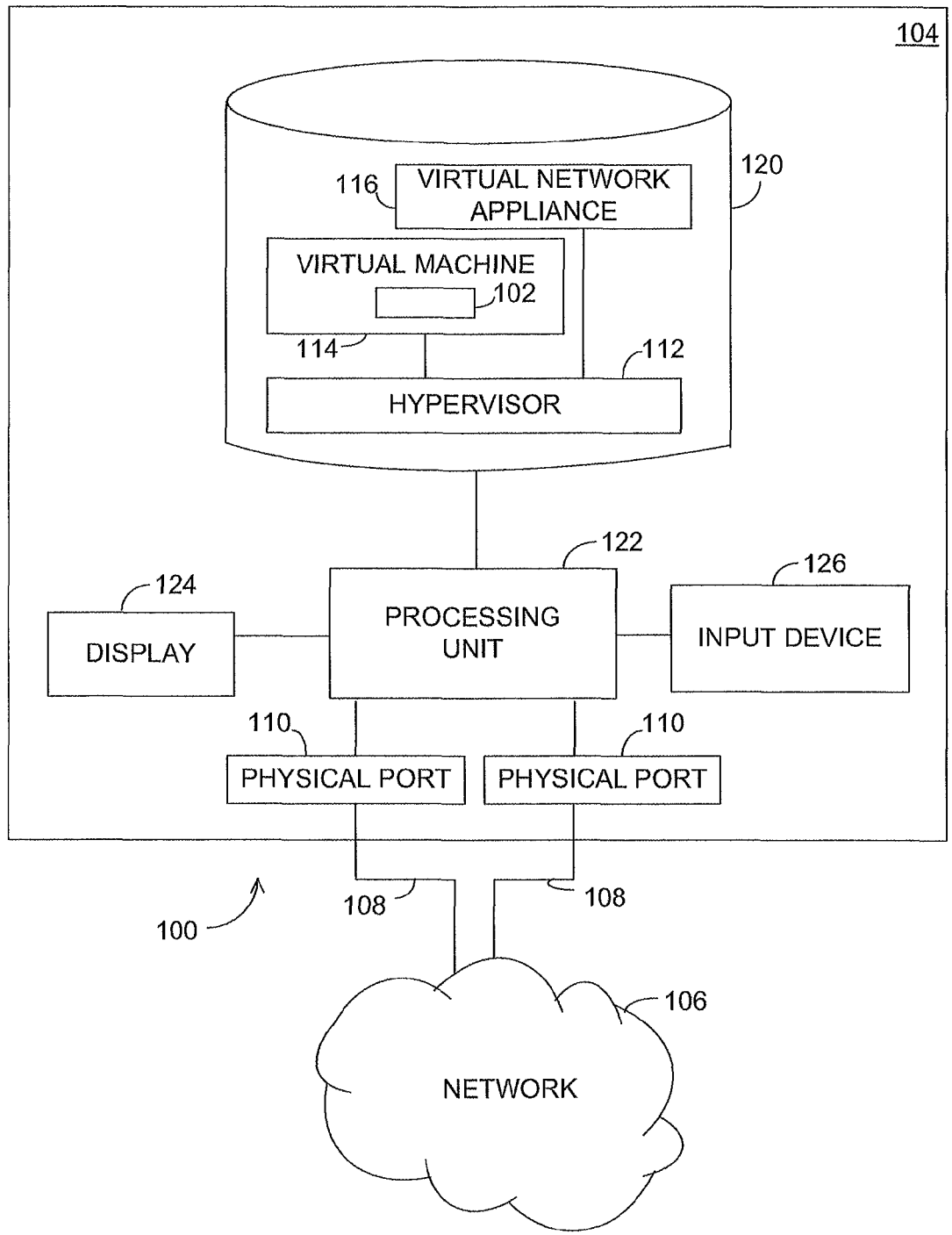
FIG. 1 illustrates an example distributed computing system (DCS) according to this disclosure.
Figure 2:
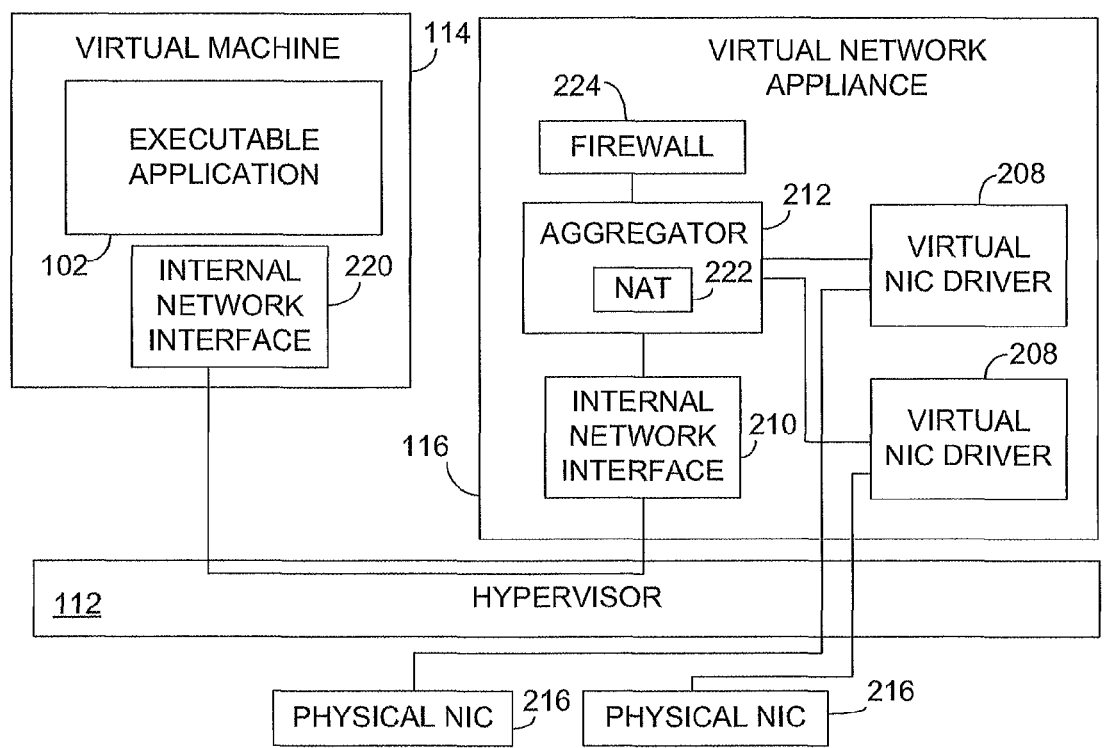
FIG. 2 illustrates example components for providing a fault tolerant Ethernet apparatus according to this disclosure.
Figure 3:
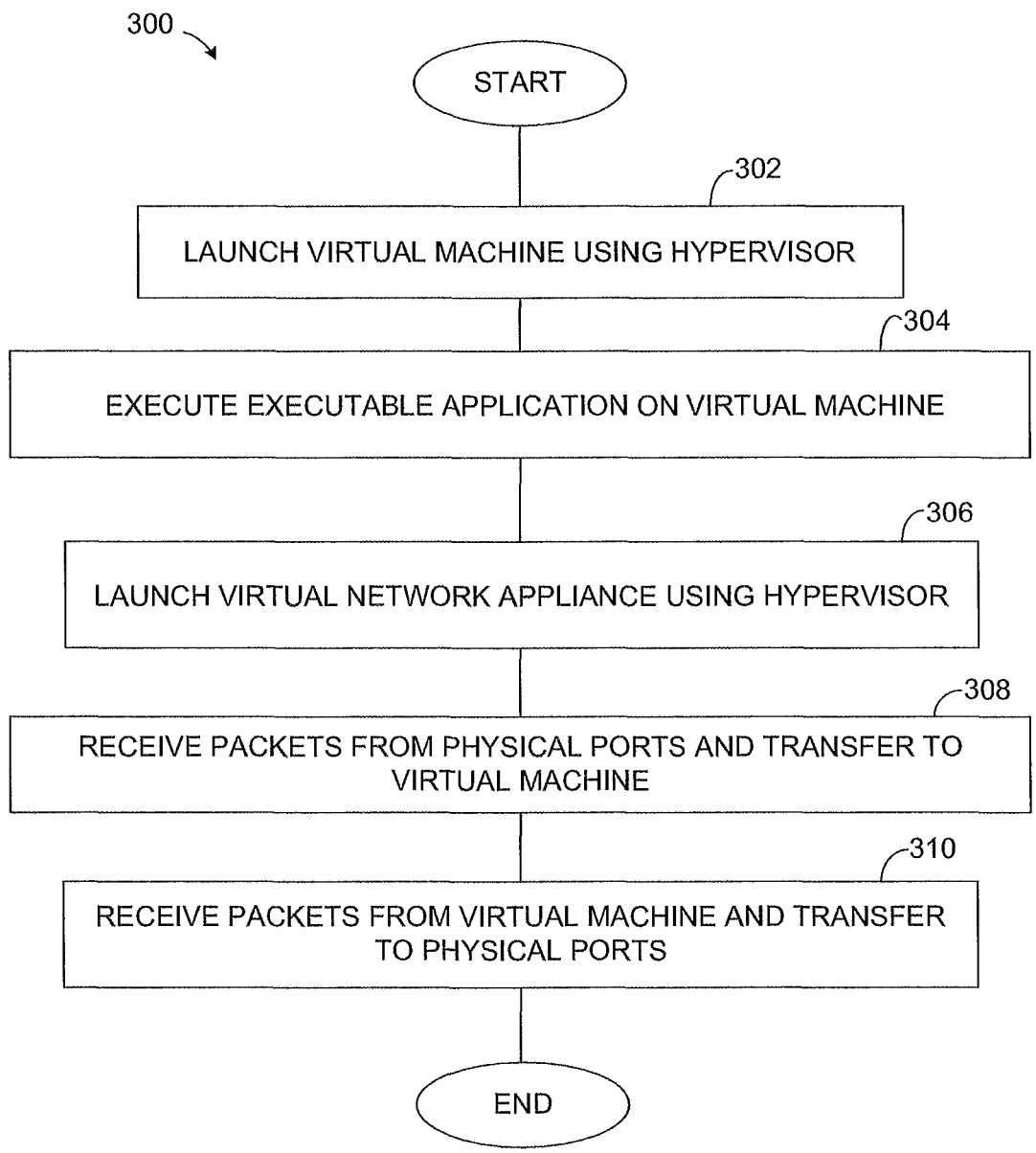
FIG. 3 illustrates an example method for providing a fault tolerant Ethernet apparatus according to this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIG. 1 illustrates an example distributed computing system (DCS) 100 according to this disclosure. As shown in FIG. 1, the DCS 100 includes an executable application 102 executed on a computing node 104. The computing node 104 obtains information over a network 106, processes the information, and transmits the processed information over the network 106. The network 106 may include other elements that support operation of the DCS 100, such as servers, routers, firewalls, industrial process controllers, and wireless interface devices. Communications between the executable application 102 and other nodes in the DCS 100 are provided using multiple interface channels 108.

In the example embodiment shown, two interface channels 108 are configured to function independently of one another and provide redundant communication paths for the node 104. In this manner, communication between the executable application 102 may be maintained in the event that one interface channel 108 fails since information can be conveyed through the other interface channel 108 that has not failed. In other embodiments, only one interface channel 108 may be provided, or three or more interface channels 108 may be provided that function independently of one another and in a redundant manner.

The interface channels 108 may include any type of interface that uses a wired or wireless medium to convey information between the computing node 104 and other nodes in the network 106. For example, the interface channels 108 may include a wireless medium such as a wireless local area network (WLAN) based on the IEEE 802.11 standard, the International Society of Automation (ISA) 100.11a standard, or a Bluetooth standard. The interface channels 108 could also support wired connections, such as wired Ethernet connections conforming to the IEEE 802.3 standard.

Physical ports 110 of the computing node 104 correspond to the interface channels 108. Each physical port 110 terminates its respective wired or wireless medium by converting signals received over that medium into a form suitable for use by the computing node 104 and vice versa. In particular embodiments, each physical port 110 includes a network interface card (NIC) that translates signals according to the IEEE 802.3 standard.

The computing node 104 includes a hypervisor 112 that may be executed by the computing node 104. The hypervisor 112 provides a virtualization environment for managing a virtual machine 114 and a virtual network appliance 116. In some embodiments, the hypervisor 112 may manage any number and type(s) of virtual machine(s) on the computing node 104. A virtual machine generally includes an operating system (OS) referred to as a "guest" OS that is executed in an environment provided by the hypervisor 112, which is often referred to as a "host." The hypervisor 112 manages the operation of the virtual machine 114 and the virtual network appliance 116 by simulating an actual hardware structure for their operation. As a particular example, the hypervisor 112 may be a virtualization product marketed under the tradename VMWARE™ provided by VMWARE, INC. However, any suitable type and/or brand of virtualization product may be implemented according to the teachings of this disclosure.

The executable application 102 may be executed in the environment provided by the virtual machine 114. By executing the executable application 102 using the virtual machine 114 rather than directly on the computing node 104, the executable application 102 may be effectively isolated from direct communication with the network 106 via the physical ports 110.

The virtual network appliance 116 is provided to facilitate communication between the executable application 102 and the network 106 in a controlled manner. That is, the virtual network appliance 116 functions as a separate network appliance to control the communication of data messages (referred to generically as "packets") between the executable application 102 and the network 106.

Some embodiments incorporating the virtual network appliance 116 may provide benefits over known implementations of computing nodes that provide NIC teaming. For example, the executable application 102 may be effectively abstracted from any specific network interface implementation provided by the underlying operating system so that periodic changes to the underlying operating system do not adversely affect operation of the executable application 102. As a particular example, enterprise applications (such as DCSs) often require re-qualification each time its underlying OS is upgraded or modified. Operating systems are routinely upgraded or modified, such as by security patches to fix specific security issues. Often, these security patches involve changes to the network interface, resulting in corresponding changes to the network interface's application program interface (API). When implemented in an enterprise system such as a DCS, additional changes are often required to the executable application 102 for qualifying use with the newly modified API of the underlying OS. Embodiments of the virtual network appliance 116 may reduce or eliminate this problem by abstracting the virtual machine 114 on which the executable application 102 is executed from the physical port 110 so that a more stable network interface is provided.

As another example, some embodiments of the virtual network appliance 116 may provide a compartmentalized tool for establishing and maintaining consistent security policies throughout the network. For instance, certain nodes in a DCS may include small applications such as thin clients or dumb terminals that are not pre-configured with, and are not readily conducive to configuration with, security layering devices like firewalls. These small applications may be executed in a virtualized environment as described above in which the virtual network appliance 116 controls communication to and from these small applications for maintaining security policies across most or all computing nodes of the DCS.

As a third example, some embodiments of the virtual network appliance 116 may provide an efficient technique for disseminating multiple copies of the executable application 102 and its associated virtual machine 114 among numerous computing nodes in an enterprise network, such as those typically encountered in process control systems of large manufacturing facilities. Most hypervisors have a native cloning feature that allows multiple copies of a virtual machine to be easily duplicated on different computing nodes. However, because the network configurations of the replicated virtual machines are different from one another, the network configuration of each duplicated virtual machine often requires re-configuration to function properly within its respective computing node. Thus, the virtual network appliance 116 provides a level of abstraction sufficient to allow cloning of additional virtual machines for alleviating the necessity of re-configuring the network redundancy protocol parameters of each cloned virtual machine.

The executable application 102 includes a set of instructions that may be executed by a virtual machine 114 that is, in turn, managed by a hypervisor 112 executed on a suitable computing node 104. The DCS 100 may include a process control system (PCS) that monitors and controls operation of a dynamically operating industrial process, such as a chemical plant or an oil refinery. In some embodiments, the executable application 102 may be implemented using the EXPERION process control system from HONEYWELL INTERNATIONAL INC.

The computing node 104 may include any suitable structure for executing the hypervisor 112, the virtual machine 114, and virtual network appliance 116. For example, the computing node 104 could be implemented using hardware only or a combination of hardware and software/firmware instructions. In this example, the computing node 104 includes at least one memory unit 120, at least one processing unit 122, at least one display 124, and at least one input device 126. The at least one memory unit 120 includes any suitable volatile and/or non-volatile storage and retrieval device(s), such as a hard disk, an optical storage disc, RAM, or ROM. The at least one processing unit 122 includes any suitable processing structure(s), such as a microprocessor, microcontroller, digital signal processor, application specific integrated circuit, or field programmable gate array. The physical ports 110 include any suitable structures for communicating over one or more networks, such as a wired Ethernet interface or a wireless interface. The display 124 represents any suitable display device for presenting information to a user. The input device 126 represents any suitable device(s) for receiving input from a user, such as a keyboard or mouse. In some embodiments, the computing node 102 may represent a desktop computer, laptop computer, dumb computer terminal, or other computing device. Often times, for embodiments in which the executable application 102 is used in a process control system, the display 124 and input device 126 may be located in a control room of a processing facility controlled by the process control system.

Although FIG. 1 illustrates one example of a DCS 100, various changes may be made to FIG. 1. For example, the system 100 could include any number and arrangement of each component. Also, FIG. 1 represents one specific way in which the DCS 100 can be implemented, and other implementations of the DCS 100 could be used. Further, the functional division shown in FIG. 1 is for illustration only. Various components in FIG. 1 could be combined, further subdivided, or omitted and additional components could be added according to particular needs.

FIG. 2 illustrates example components for providing a fault tolerant Ethernet apparatus according to this disclosure. As shown in FIG. 2, the virtual network appliance 116 includes two or more virtual NIC drivers 208 coupled to an internal network interface 210 through an aggregator 212. The virtual machine 114 includes an internal network interface 220.

Each virtual NIC driver 208 communicates, using the hypervisor 112, with a physical network interface card (NIC) 216 of the computing node 104. To accomplish this, the hypervisor 112 provides an association of each virtual NIC driver 208 with the physical NIC card configured in the computing node 104. For embodiments in which the network 106 includes an Ethernet network, the association between the virtual NIC driver 208 and its respective physical NIC 216 may be a layer-3 (network layer) association or a layer-2 (MAC layer) association.

In some embodiments, the virtual network appliance 116 may include an embedded real-time operation system (RTOS) that is installed as a guest operating system by the host hypervisor 112. In other embodiments, the virtual network appliance 116 may be provided as a black-box device from a manufacturer of the hypervisor 112 on which it is executed. The RTOS may include any suitable operating system that routes communication traffic between the virtual machine 114 and the physical NICs 216 with sufficient performance for its intended use. One example of a suitable RTOS is the INTEGRITY OPERATING SYSTEM from GREENHILLE, INC.

The internal network interface 210 communicates, using the hypervisor 112, with the internal network interface 220 of the virtual machine 114. The internal network interface 210 may be communicatively coupled to the internal network interface 220 in any manner that does not allow direct coupling of the internal network interface 220 to the physical NIC 216 of the computing node 104. In some embodiments, the internal network interface 210 may be coupled to the internal network interface 220 using a loopback connection in which all packets between the internal network interface 210 and the internal network interface 220 are limited to communication with each other. In other embodiments, the internal network interface 210 may be coupled to the internal network interface 220 through another virtual network interface (not shown) or a physical NIC of an additional NIC card (not shown) in the computing node 104. In this configuration, the additional virtual network interface or physical NIC may be sniffed, using a sniffer, to identify packets transferred between the internal network interface 220 and the internal network interface 210. For example, the internal network interface 220 and the internal network interface 210 may be coupled together through an additional virtual network interface or a physical NIC of a third NIC card during its development stage for testing purposes. In a production stage following development, however, the internal network interface 220 and the internal network interface 210 may be re-configured in a loopback connection so that optimal isolation of the virtual machine 114 from the physical NIC 216 may be maintained.

The virtual NIC drivers 208 are coupled to the internal network interface 210 of the virtual network appliance 116 through the aggregator 212. The aggregator 212 may be considered as a network switch or router that controls the transfer of packets to and from the internal network interface 210 and the virtual NIC drivers 208. In this respect, the aggregator 212 can have a network address table (NAT) 222 that includes entries associated with potential destination addresses of packets originating from the internal network interface 220. When the aggregator 212 receives a packet, it may route the packet according to its destination address and a corresponding entry in the network address table 222.

The aggregator 212 may include any suitable structure and functionality for routing packets between the internal network interface 220 of the virtual machine and the virtual NIC drivers. For example, the aggregator 212 may include one or more fault tolerant detection schemes that detect path failures of packets routed through the virtual network appliance 116. In some embodiments, the aggregator 212 may be configured to function with a proprietary network having one or more fault tolerant detection schemes such as the FAULT TOLERANT ETHERNET (FTE) network from HONEYWELL INTERNATIONAL INC. that conforms to Section 7 of the International Electrotechnical Commission x(IEC) 65C 62439 standard.

In some embodiments, the aggregator 212 may be configured to route packets to or from the virtual NIC drivers 208 that are configured for redundant operation or that are configured for single-ended operation. Redundant operation generally refers to a communication reliability scheme in which multiple interfaces or network paths are available so that, when combined with a redundant logic mechanism, a break or failure in the communication path does not cause communications to fail. Single-ended operation, however, generally relates to a communication scheme in which each interface channel 108 may independently communicate with a separate node or network address in the network.

In redundant operation, the aggregator 212 makes forwarding decisions based on the type of redundant operation to route packets between the virtual NIC drivers 208 and the internal network interface 210. One example of a redundant mode operation may include duplicate based redundancy, status based redundancy, or other suitable redundancy scheme. As an example in which the virtual NIC drivers 208 are configured for redundant operation, the aggregator 212 may transmit packets originating from the internal network interface 210 through both virtual NIC drivers 208. For packets received from the virtual NIC drivers 208, the aggregator 212 may determine whether duplicate copies of a packet are received from the virtual NIC drivers 208 and transmit a single one of the packets to the internal network interface 210. As an example in which the virtual NIC drivers 208 are configured for single-ended operation, the aggregator 212 may route packets originating from the internal network interface 220 to one of the virtual NIC drivers 208 according to the packets' destination addresses.

In some embodiments, the virtual network appliance 116 includes a firewall 224 that provides authentication and inspection of packets received from the internal network interface 210 or the virtual NIC driver 208. For example, the firewall 224 may function according to an Internet Protocol Security (IPSEC) protocol or a network layer security protocol (NLSP) for regulating transfer of packets through the aggregator 212. Additionally, the firewall 224 may be totally configurable, partially configurable, or non-configurable by the end user. That is, the firewall 224 may be selectively configurable such that only those features of the firewall 224 that are intended to be manipulated by the end user may be changed. For example, numerous copies of the virtual network appliance 116 may be configured on numerous computing nodes of an enterprise system. In this case, it may be beneficial that the firewall 224 of each virtual network appliance 116 behaves in a consistent, known manner for each computing node in the network. In some embodiments, configuration of the firewall 224 may be provided by a login session that is password protected.

In some embodiments, the aggregator 212 includes one or more monitoring functions for collecting, monitoring, and/or managing network traffic through the virtual network appliance 116. For example, the aggregator 212 may include a logging function that records all or certain types of network traffic through the virtual network appliance 116. In this regard, the logging function may include customizable filters that allows the user to determine what types of network traffic are logged. Additionally, the logging function may be configured to generate statistical information associated with the type of network traffic through the virtual network appliance 116, and/or generate alarms in the event that certain types of network traffic are detected. As another example, the aggregator 212 may include a status indicating function for reporting errors in the virtual network appliance 116 or in network traffic passing through the virtual network appliance 116.

Although FIG. 2 illustrates examples of components for providing a fault tolerant Ethernet apparatus, various changes may be made to FIG. 2. For example, the functional division shown in FIG. 2 is for illustration only. Various components in FIG. 2 could be combined, further subdivided, or omitted and additional components could be added according to particular needs. As a particular example, the firewall 224 may be integrally incorporated within the aggregator 212. Also, although the components are shown and described as being executed on a single computing node 104, the components may be executed on a networked or distributed computing system incorporating multiple computing nodes.

FIG. 3 illustrates an example method 300 for providing a fault tolerant Ethernet apparatus according to this disclosure. As shown in FIG. 3, a virtual machine is launched using a hypervisor at step 302. Once started, an executable application is executed on the virtual machine at step 304. The executable application could include, for example, a process control application that monitors and controls various aspects of a dynamic industrial process.

A virtual network appliance is launched using the hypervisor at step 306. In some embodiments, the virtual network appliance may include an embedded real-time operation system. The virtual network appliance may have any number of virtual NIC drivers corresponding to the number of available physical ports configured on the computing node executing the hypervisor. In particular embodiments, the virtual network appliance includes two or more virtual NIC drivers that function redundantly so that a break or other failure of one interface channel does not disconnect the executable application from a network. The virtual network appliance may have any suitable number of virtual NIC drivers and be configured to function redundantly or in single-ended fashion.

The virtual network appliance receives packets from the physical ports and transfers these packets to the virtual machine at step 308. If configured to function according to a redundant protection scheme, the virtual network appliance may, upon receipt of a packet from one physical port, determine whether the same packet has been received by another port. If so, the virtual network appliance may forward only one copy of the packet to the virtual machine. In this manner, redundant operation may occur seamlessly, and a fault or failure of one interface channel may result in essentially no loss of packets.

The virtual network appliance receives packets from the virtual machine and transfers these packets to the physical ports at step 310. The virtual network appliance may use a network address table 222 for selectively routing the received packets according to associated entries in the network address table. In some embodiments, the virtual network appliance may filter packets according to a specified security schema using the firewall 224. In particular embodiments, the virtual network appliance provides an additional test port that exposes packets transferred to and from the virtual machine. The test port may include an additional interface with an API that is accessible by another application so performing sniffing functions. Steps 308-310 may be repeatedly performed during operation of the virtual machine. When use of the virtual machine is no longer needed or desired, the method ends in step 314.

Although FIG. 3 illustrates one example of a method 300 for providing a fault tolerant Ethernet apparatus, various changes may be made to FIG. 3. For example, while shown as a series of steps, various steps in FIG. 3 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with" and its derivatives mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "receive" and its derivatives include receipt from an external source or an internal source.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   at least one processing device configured to execute a virtual network appliance and a virtual machine, the virtual network appliance comprising:
   an aggregator;

a virtual network interface card (NIC) driver configured to transfer packets (i) from the aggregator to a physical port of the apparatus and (ii) from the physical port to the aggregator; and an internal network interface configured to transfer the packets to and from the virtual machine through a hypervisor;

wherein the aggregator is configured to transfer the packets between the virtual NIC driver and the internal network interface, wherein the virtual NIC driver is communicatively coupled to the internal network through the aggregator.

2. The apparatus of claim 1, wherein the virtual network appliance comprises multiple virtual NIC drivers configured to communicate with multiple physical ports.

3. The apparatus of claim 2, wherein the aggregator is configured, when two or more packets from the virtual NIC drivers are copies of one another, to provide one of the packets to the internal network interface.

4. The apparatus of claim 2, wherein:
the aggregator comprises a network address table; and
the aggregator is configured to:
receive the packets from the internal network interface, the packets comprising destination addresses; and
route the packets to one or multiple virtual NIC drivers using the network address table.

5. The apparatus of claim 1, wherein the virtual machine is inhibited from transferring packets directly to and receiving packets directly from the physical port.

6. The apparatus of claim 1, wherein the virtual network appliance further comprises a firewall configured to filter the packets according to a specified schema.

7. The apparatus of claim 6, wherein the firewall is configured to function according to an Internet protocol security (IPSEC) protocol or a network layer security protocol (NLSP).

8. The apparatus of claim 6, wherein the firewall is limited to configuration during a secured login session.

9. The apparatus of claim 1, wherein the virtual network appliance further comprises a test network interface configured to expose the packets that are transferred through the aggregator.

10. A method comprising:
executing a virtual network appliance on a computing system, the virtual network appliance comprising an embedded real-time operating system;
receiving a packet from a physical port of the computing system at a virtual network interface card (NIC) driver of the virtual network appliance; and
transferring the packet from an internal network interface of the virtual network appliance to a virtual machine executed by the computing system through a hypervisor;
wherein transferring the packet comprises transferring the packet from the virtual NIC driver to the internal network interface through an aggregator of the virtual network appliance, the virtual NIC driver communicatively coupled to the internal network interface through the aggregator.

11. The method of claim 10, wherein receiving the packet comprises receiving the packet from one of at least two physical ports of the computing system.

12. The method of claim 11, wherein transferring the packet comprises, when two or more packets from the physical ports are copies of one another, transferring one of the packets to the virtual machine.

13. The method of claim 11, further comprising:
receiving multiple packets comprising destination addresses from the virtual machine at the virtual network appliance; and
routing the packets to one or more of the physical ports using a network address table.

14. The method of claim 10, further comprising:
inhibiting transfer of packets directly between the physical port of the computing system and the virtual machine.

15. The method of claim 10, further comprising:
filtering the packet using a firewall in the virtual network appliance.

16. The method of claim 15, wherein the packet is filtered according to an Internet protocol security (IPSEC) protocol or a network layer security protocol (NLSP).

17. The method of claim 15, further comprising:
limiting the firewall to configuration only during a secured login session.

18. The method of claim 10, further comprising:
exposing the packet that is transferred through the virtual network appliance using a test network interface.

19. A non-transitory computer readable medium embodying computer readable program code, the computer readable program code comprising:
a virtual network appliance configured to be executed on a computing system and to be managed by a hypervisor, the virtual network appliance comprising:
an aggregator;
multiple virtual network interface card (NIC) drivers configured to communicate with multiple physical ports of the computing system, each virtual NIC driver configured to transfer packets (i) from the aggregator to one of the physical ports and (ii) from the one of the physical ports to the aggregator; and
an internal network interface configured to transfer packets to and from a virtual machine; and
wherein the aggregator is configured to transfer the packets between the virtual NIC drivers and the internal network interface, wherein the virtual NIC drivers are communicatively coupled to the internal network interface through the aggregator.

20. The non-transitory computer readable medium of claim 19, wherein the virtual machine is inhibited from transferring packets directly to and receiving packets directly from the physical ports of the computing system.

* * * * *